(12) United States Patent
Hull et al.

(10) Patent No.: US 6,415,349 B1
(45) Date of Patent: Jul. 2, 2002

(54) DISK DRIVE WITH UNIFIED CHANNEL-DISK CONTROLLER BUS FOR TRANSMITTING USER DATA, SERVO DATA, AND REGISTER DATA

(75) Inventors: Richard W. Hull, Laguna Hills; Hoover K. Jung, Rosemead; Sanjay S. Mathur, Laguna Hills, all of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/489,856

(22) Filed: Jan. 24, 2000

(51) Int. Cl.$^7$ .............................................. G06F 12/00
(52) U.S. Cl. .................. 711/100; 711/112; 360/39; 360/51; 360/73.02
(58) Field of Search ................... 711/112, 100, 711/111; 360/39–77.08

(56) References Cited

U.S. PATENT DOCUMENTS

| | | | |
|---|---|---|---|
| 5,341,249 A | * | 8/1994 | Abbott et al. ................. 360/46 |
| 5,606,466 A | | 2/1997 | Fisher et al. |
| 5,829,011 A | | 10/1998 | Glover |
| 6,178,056 B1 | * | 1/2001 | Cloke et al. .................. 360/46 |
| 6,278,568 B1 | * | 8/2001 | Cloke et al. .................. 360/51 |

* cited by examiner

Primary Examiner—Do Hyun Yoo
Assistant Examiner—Nasser Moazzami
(74) Attorney, Agent, or Firm—Milad G Shara (57) ABSTRACT

A disk drive has a unified bus forming a signal path for transmitting register data, user data and servo sectors. The unified bus is connected between a channel circuit and a disk controller circuit. The channel circuit has an output stream engine which responds to and provides control signals to multiplex data on the unified bus at various times between demodulated user data, servo sector data and register data.

21 Claims, 11 Drawing Sheets

Fig. 6C

DISK DRIVE WITH UNIFIED CHANNEL-DISK CONTROLLER BUS FOR TRANSMITTING USER DATA, SERVO DATA, AND REGISTER DATA

BACKGROUND OF THE INVENTION

1. Field of the Invention

The invention relates to a disk drive including a read channel circuit and a disk controller circuit. More particularly, the invention relates to a disk drive which demodulates a read signal representing data in a data sector and a servo sector in a first order and provides data-sector data and servo sector data to a disk controller in a second order.

2. Description of the Prior Art and Related Information

Magnetic hard disk drives conventionally arrange data as blocks, also known as sectors, within concentric tracks on the surface of rotating storage mediums. Such disk drives are described in U.S. Pat. No. 5,606,466 to Fisher et at Disk drive storage capacity is governed by the areal density expressed in bits/in$^2$ which can be achieved on a disk media surface. The two components of areal density are track pitch (the distance between adjacent tracks) and linear bit density (the distance between bits along a track). Improvements in linear bit density are to a great extent dependent on signal processing in a read channel circuit which demodulates signals read from the track to produce digital symbols.

In order to continue improving linear bit density and maintain competitive product offerings, read channel demodulating circuits currently and will continue to provide more complex signal processing, which will in turn require longer periods of latency to convert media signals to digital symbols which can be provided to a disk controller or formatter for assembly into discrete data blocks and error correction.

The latency problem is further complicated by the embedded servo system employed in most disk drives to control read/write head positioning by interspersing servo sectors with data regions on each track of a disk surface. Such a system is described in application Ser. No. 08/815,352 filed Mar. 11, 1997 (the Sync Mark Application), assigned to the assignee of this invention. The Sync Mark Application is hereby incorporated by reference in its entirety.

With an embedded servo system, servo sectors must be processed by the channel circuit in real time regardless of signal processing which is related to data sectors. The above-mentioned embedded servo system format requires that servo sectors and data sectors are alternately presented to a read channel circuit for demodulating. The servo sectors must be demodulated and presented with minimal latency to a servo controller which may be included in a disk controller circuit to enable the servo system to maintain control of the position of read/write heads. The disks controller comprises a timer for sampling the servo sectors synchronous with the servo sample rate as described in the Sync Mark Application.

After demodulating the servo and data sectors, the read channel transmits them on a bus connected between the channel circuit and the disk controller, the combination defining a disk drive signal path. The disk controller is responsible for providing timing signals which alert the channel circuit to presence of servo or data sectors which are currently passing or about to pass under the read/write head by asserting one of a plurality of signals comprising a SERVO GATE, a READ GATE and a WRITE GATE for defining periods or intervals for reading servo sectors, or reading or writing data sectors, on the rotating med. Generally, asserting a signal as defined herein means driving a signal to its logically "true" state regardless of polarity. A further convention used herein is to identify signals having negative polarity assertions with a trailing "-" sign as for example SYNC DET-.

As linear bit densities have increased, the problem of so-called pulse crowding has become more prevalent. Pulse crowding problems and their drawbacks are described in U.S. Pat. No. 5,606,466. As further described therein more powerful synchronously sampled data detection channels have been employed to place coded information bits, which can be placed more closely together, within the data sectors. One class of read channels comprises partial response, maximum likelihood (PRML) channels also described in U.S. Pat. No. 5,341,249 to Abbott et al, and the Sync Mark Application.

PRML channels, and other read channels which work with coded bits, demodulate the coded bits when receiving the data bits from the data sectors. This process is also knowm as demodulating the data sectors and is so called herein. As discussed in U.S. Pat. No. 5,606,466, the demodulating of the data sectors causes a demodulating delay, or latency, of at least several bytes for typical bit coding algorithms of today. Conversely, the servo sectors are typically not coded to such a degree, and therefore an inequality in demodulating time by the read channel exists between the servo sectors, which are and must be demodulated in relative real time without such a latency, and the data sectors, which have heretofore been demodulated and transmitted to the disk controller in order of receipt from the rotating medium Further, as bit coding techniques become more complicated, so that linear bit densities may increase, the latency for demodulating the data sectors may increase to hundreds of bits or even multiple sectors. However, the servo sectors must nevertheless be demodulated and transmitted to the disk controller in real time so that the servo system may keep the transducer head in the servo system on track.

Some systems add pad fields or speed tolerance buffers to separate sectors on the drive so that the digital latency delay may be compensated for on the rotating medium as described with respect to FIG. 1 in U.S. Pat. No. 5,606,466. U.S. Pat. No. 5,606,466 describes another technique for dealing with the latency period which comprises clocking real-time and digital signal processes by a clock synchronized to the data sector as the data sector passes under the transducer head, clocking the digital signal processes for the data sector by an asynchronous clock, and clocking the servo sector in real time. However, neither of these solutions allow for larger latencies during which the servo sector must be demodulated and transmitted to the disk controller in real time while a previously received data sector or segment thereof is stil being demodulated. Adding pad fields between sectors is undesirable because such a technique lowers the capacity of the hard disk system. The latter technique is undesirable because it delays both the demodulating of data sectors, and the demodulating of the servo sectors so that the order of transmission of the servo and data sectors maybe maintained after the latency. It is not desirable to delay demodulating the servo sectors because the servo sectors provide the information needed for the disk controller to keep the servo system on track.

Accordingly, what is needed is a system and method for allowing a longer latency period for demodulating and transmitting of the data sectors, while allowing demodulating and transmitting of the servo sectors in relative real-time. Such a system would ideally be implemented without having to define a separate or significantly wider set of data lines in the disk controller bus between the channel circuit and the disk controller. U.S. Pat. No. 5,829,011 discloses a method for transmitting register values and user data on the same lines. However, the system disclosed therein does not provide a method for allowing a longer latency period for demodulating and transmitting of data sectors, while allowing demodulating and transmitting of the servo sectors in relative real-time.

SUMMARY OF THE INVENTION

This invention can be regarded as a disk drive comprising a disk comprising a track having a data sector and a servo sector. The disk drive includes a channel circuit, a disk controller circuit and a unified bus connected between the channel circuit and the disk controller circuit and having a data-carrying medium. The channel circuit comprises a channel register for storing register data; means for receiving and demodulating a first series of signals representing data stored in the servo sector to create a first demodulated series of signals; means for receiving and demodulating a second series of signals representing data stored in at least a portion of the data sector to create a second demodulated series of signals; and a channel output stream engine coupled to the unified bus for transmitting/receiving the register data and for transmitting the first and second demodulated series of signals on the data-carrying medium. During a first interval the data-carrying medium reflect the register data, during a second interval the data-carrying medium reflect the first demodulated series of signals, and during a third interval the data-carrying medium reflect the second demodulated series of signals.

Preferably, the unified bus includes a read signal a servo gate signal and a data valid signal. In a preferred embodiment the data valid is asserted for transmitting each of the first and second demodulated series of signals.

BRIEF DESCRIPTION OF THE DRAWINGS

FIGS. 6A–6D depict flowcharts illustrating operations of the disk controller circuit of FIG. 1.

DETAILED DESCRIPTION

Figure 1:
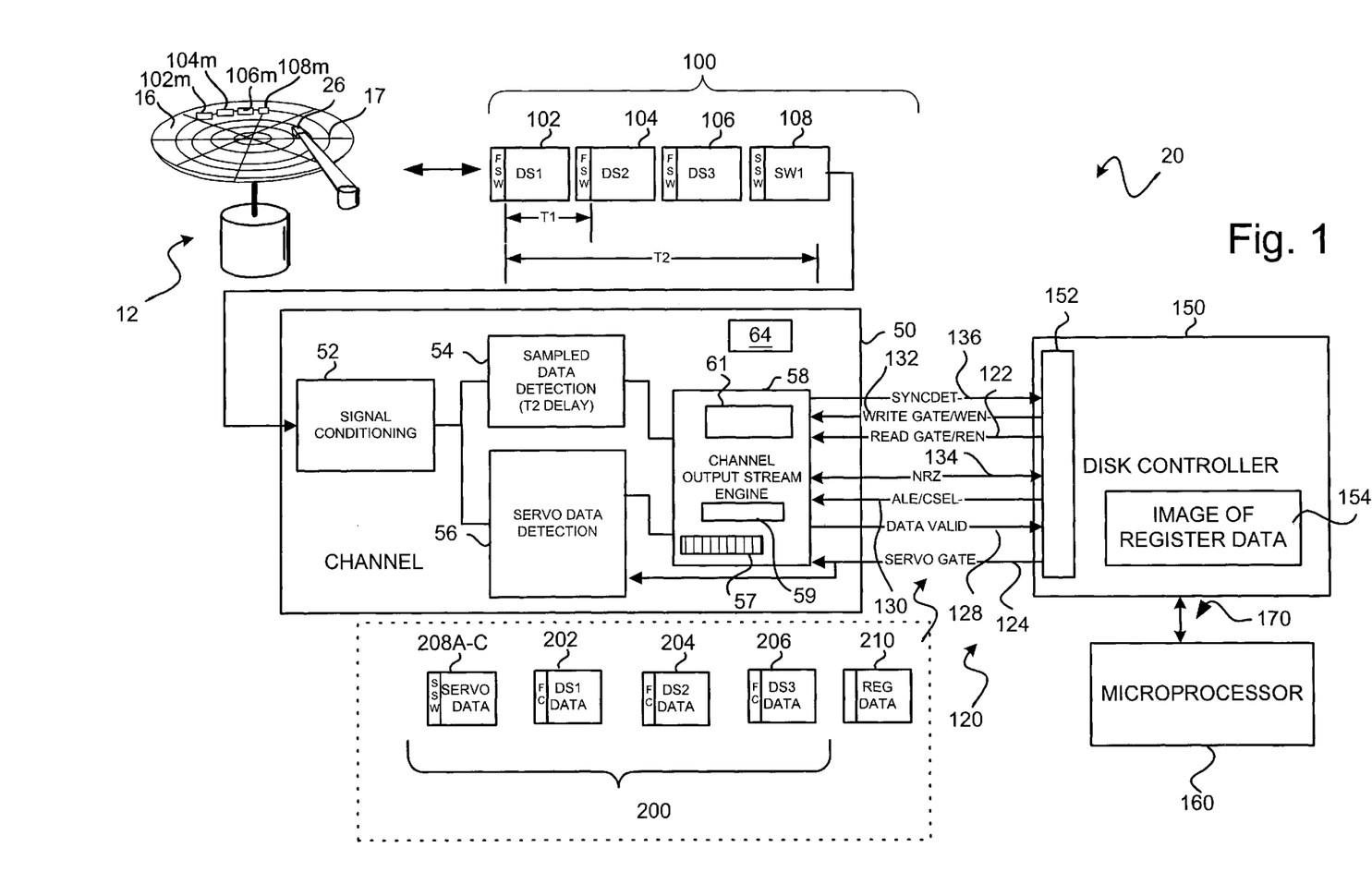
FIG. 1 depicts a disk drive according to an embodiment of this invention.

With reference to FIG. 1, a disk drive 20 comprises a head and disk assembly (HDA) 12. The head and disk assembly 12 includes at least one disk 16. A track 17 on disk 16 has data sectors 102m, 104m, 106m and a servo sector 108m arranged in a first order. A read head 26 reads data sectors 102m, 104m, 106m, and servo sector 108m as disk 16 rotates to provide a read signal 100, shown as a graphical series of signal segments comprising data sector representing signals 102, 104, and 106, and servo sector representing signal 108 in conformance with the first order, the read signal 100 thereby alternately representing data stored in a respective data sector or servo sector.

Read signal 100 is provided to a channel circuit 50 for demodulation. Channel circuit 50 provides means for demodulating read signal 100 comprising signal conditioning circuit 52, sampled data detection circuit 54, and servo data detection circuit 56. Suitably, data detection circuit 54 may include a viterbi detector or may employ a form of iterative decoding as is discussed in commonly assigned pending patent application Ser. No. 09/393,511, which is herein incorporated by reference. Such iterative decoding may include a maximum a posteriori (MAP) detector. Data-sector data segments 202A,B 204, 206 are produced by sampled data detection circuit 54 corresponding to respective segments 102, 104, 106 of read signal 100 while servo data detection circuit 56 produces demodulated servo-sector data 208A–C representing three exemplary servo sector components. The three servo sector components are: track identification (TID) 208A; servo burst data (BRST) 208B and auxiliary data (AUX) 208C. A bus 120 connects channel circuit 50 to a disk controller circuit 150 which comprises circuitry for processing the demodulated data-sector and servo-sector data.

A channel output stream engine 58 embodies a means for providing the demodulated data and servo sector signals to the disk controller circuit 150 via bus 120. Channel output stream engine 58 multiplexes the outputs of sampled data detection circuit 54 and servo data detection circuit 56 to deliver the demodulated sector signals in a second order, shown in output stream 200 which is different than the first order shown in read signal 100.

The necessity for an out-of-order delivery is illustrated in FIG. 1 by the comparison of the time between successive read signal components, labeled T1, and the demodulating delay from sampled data detection circuit 54, labeled T2. In the example shown, servo sector signal 108 will be processed by servo data detection circuit 56 before a preceding data sector signal 102 is filly processed. Suitably, channel output stream engine 58 provides control logic to recognize such a condition and buffering to enable demodulating of data sector signals to continue while a demodulated servo sector 208A–C is delivered to disk controller 150. The T2 delay illustrated in FIG. 1 is only one case. Numerous variations of T2 latency are possible, ranging from multiple bytes to multiple sectors in length.

The output stream engine circuit 58 further comprises a bus interface 59 for managing bus 120 operations for the channel circuit 50, and a memory 61 for temporary storage of processed digital data. In one embodiment, memory 61 is a first-in first-out (FIFO) buffer. In another embodiment, memory 61 is a dual ported RAM.

Bus 120 can be configured as a TTL or CMOS level single-ended bus or a low voltage differential signaling (LVDS) bus, and is uniquely configured as a "unified bus"; that is, bus 120 is used for transmitting demodulated user data and demodulated servo data from channel circuit 50 to controller circuit 150; for transmitting user data to channel circuit 50 for encoding and writing on disk 16 and for transmitting register data between channel circuit 50 and disk controller 150. In one embodiment, bus 120 comprises a set of control/data signals comprising READ GATE/REN 122, SERVO GATE 124, WRITE GATE-/WEN- 132, DATA VALID 128, ALE/CSEL- 130, NRZ DATA BUS 134, and SYNC DET- 136. Some of the above-listed signals of unified bus 120 have dual functions indicated by the/ between mnemonics. The operation of bus 120 as a unified bus is explained in more detail below generally applying the signal name appropriate to the active function for dual function signals.

Figure 2:
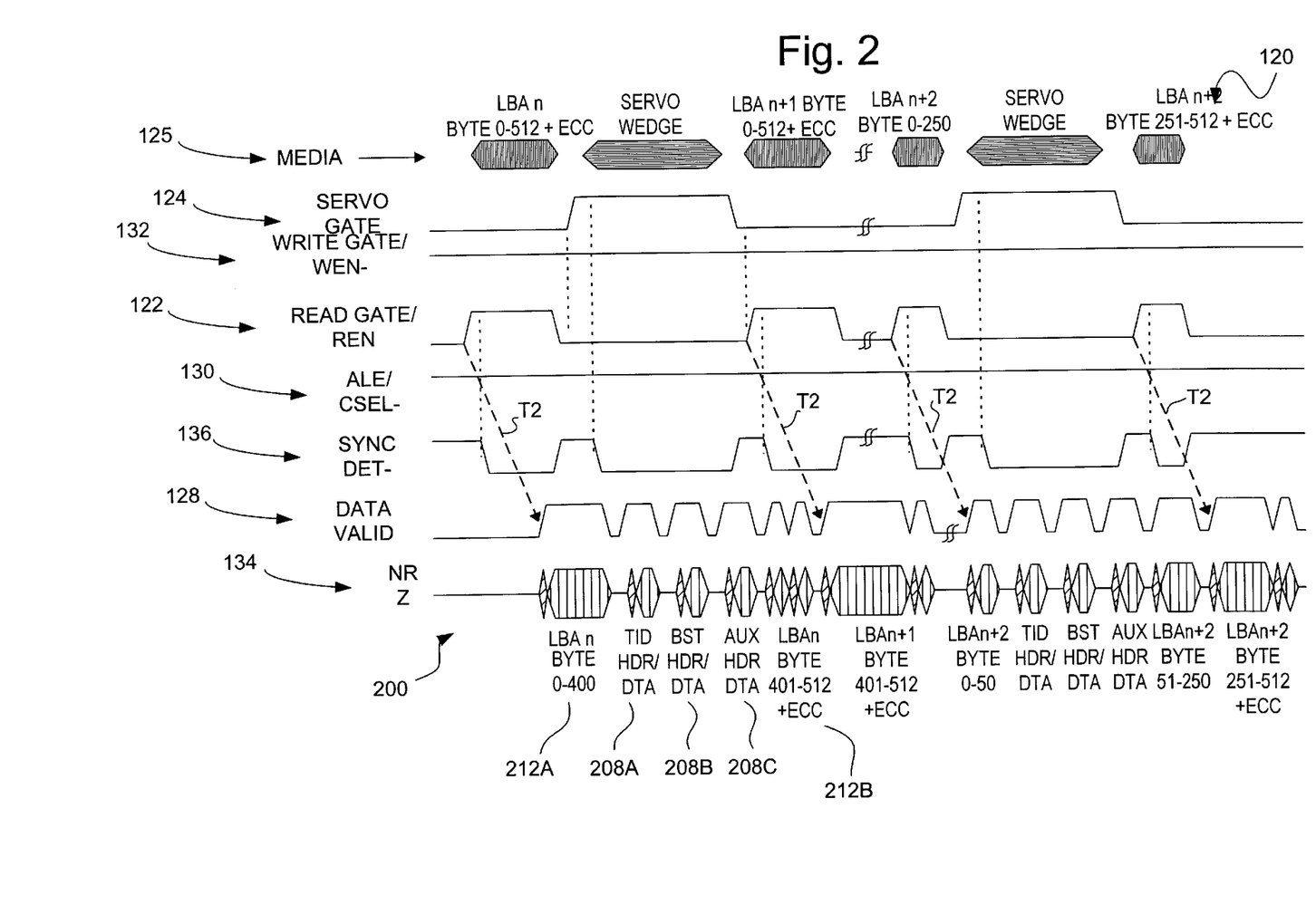
FIG. 2 depicts a timing diagram illustrating transmission of demodulated data-sector data and servo-sector data between the channel circuit and disk controller circuit of the disk drive of FIG. 1.

With reference to FIG. 2, a series of time-aligned graphic rows illustrating a user data read operation of data sectors with appended ECC bytes noted as LBA n, LBA n+1, and LBA n+2 on the unified bus 120 is shown. Media row 125 portrays a series of symbolic geometric shapes representing LBA n, LBA n+1, LBA n+2 and intervening servo sectors, frequently termed "servo wedges," being read from a track 17 on disk 16. Media row 125 provides a relative timing reference for the symbolic geometric shapes appearing on the row labeled NRZ DATA BUS 134 which represent a demodulated output stream similar to 200 of FIG. 1 appearing on NRZ data bus 134. Each geometric shape represents a "Packet" comprising one or more data bytes transmitted on the NRZ DATA BUS 134 where each packet is preceded by an identifying header byte, indicated by a diagonally striped diamond, and data bytes are indicated by a vertically striped hexagon.

Initially, READ GATE 122 is asserted by disk controller circuit 150 to define a read interval enabling channel circuit 50 to begin demodulating a user data sector read signal such as LBA n. After the T2 demodulating delay, DATA VALID 128 is asserted by channel circuit 50 and a first portion of data-sector data from LBA n (bytes 0–400 of 512), labeled as 212A, is placed on NRZ DATA BUS 134. Before all data-sector data from LBA n can be transmitted to disk controller circuit 150, SERVO GATE 124 is asserted by the disk controller circuit 150 when it is time for a servo wedge on the rotating disk 16 to pass under the transducer head 26 as shown. When a servo sector sync mark is detected, channel circuit 50 asserts SYNC DET- 136. Subsequently, channel circuit 50 de-asserts DATA VALID 128 and pauses transmission of data-sector data 212A. Next, DATA VALID 128 is successively asserted and de-asserted as demodulated servo sector components 208A–C, each preceded by an identifying header byte, are placed on NRZ DATA BUS 134. In one embodiment, servo packets 208A–C respectively provide track ID, digitized servo burst amplitude, and auxiliary servo data such as repeatable runout and or wedge ID data.

After the servo wedge passes under head 26, SERVO GATE 124 is de-asserted and READ GATE 122 is asserted to enable demodulating the next user data sector LBA n+1. When the sync byte or Frame sync for LBA n+1 is detected, channel circuit 50 once again asserts SYNC DET- 136. Meanwhile, channel circuit 50 continues the interrupted transmission of data-sector data signals LBA n with portion 212B (bytes 401–512 plus ECC bytes), asserting DATA VALID 128 to do so. Preferably during transmission of the ending portion 212B, DATA VALID 128 is cycled as shown to delineate the transmission of ECC redundancy bytes.

Continuing in a similar manner, demodulated signals representing LBA n+1 and a subsequent servo wedge are transmitted over unified bus 120. Of particular interest in FIG. 2, user data sector LBAn+2 is transmitted in three segments, representing a case where LBAn+2 is a "split" data sector, written in two portions having a servo wedge disposed there between. The transmission of the first demodulated portion (bytes 0–250) is interrupted by the servo wedge, then continues to completion after the demodulated servo sector is transmitted, and is then followed by the second portion (bytes 251–512 plus ECC).

In the disk drive of the invention, READ GATE 122 thus effectively serves as a "request signal" which alerts the channel circuit 50 that demodulated data is being requested by disk controller circuit 150. Similarly, DATA VALID 128 serves as an "acknowledge" function. The resulting request/ acknowledge interface between disk controller circuit 150 and channel circuit 50 enables the demodulated data transmission to be asynchronous with the media, thereby coping with virtually any demodulating latency.

In other embodiments, READ GATE 122, and/or SERVO GATE 124 and/or WRITE GATE 132 may be asserted as pulses which are shorter than the corresponding interval for channel circuit 50 to respectively read data on the media, read a servo wedge on the media or write a user data sector to the media. In these cases, for example channel circuit 50 can be programmed via a register setting to define the corresponding interval.

In another embodiment, unified bus 120 may be a bidirectional serial bus and timing/control signals such as SERVO GATE 124, READ GATE 128, WRITE GATE 132, and DATA VALID 128 may be implemented as uniquely coded bytes or bit sequences on the serial bus with signal assertion being implied by the uniquely coded bytes or bit sequences. In this embodiment, user data can be transmitted on unified bus 120 in serial packets. NRZ DATA BUS 134 is a generalization for any data-carrying medium and can be the above-mentioned bill directional serial data bus, a pair of unidirectional serial data lines, a set of parallel data lines or any suitable configuration for carrying data.

Figure 3:
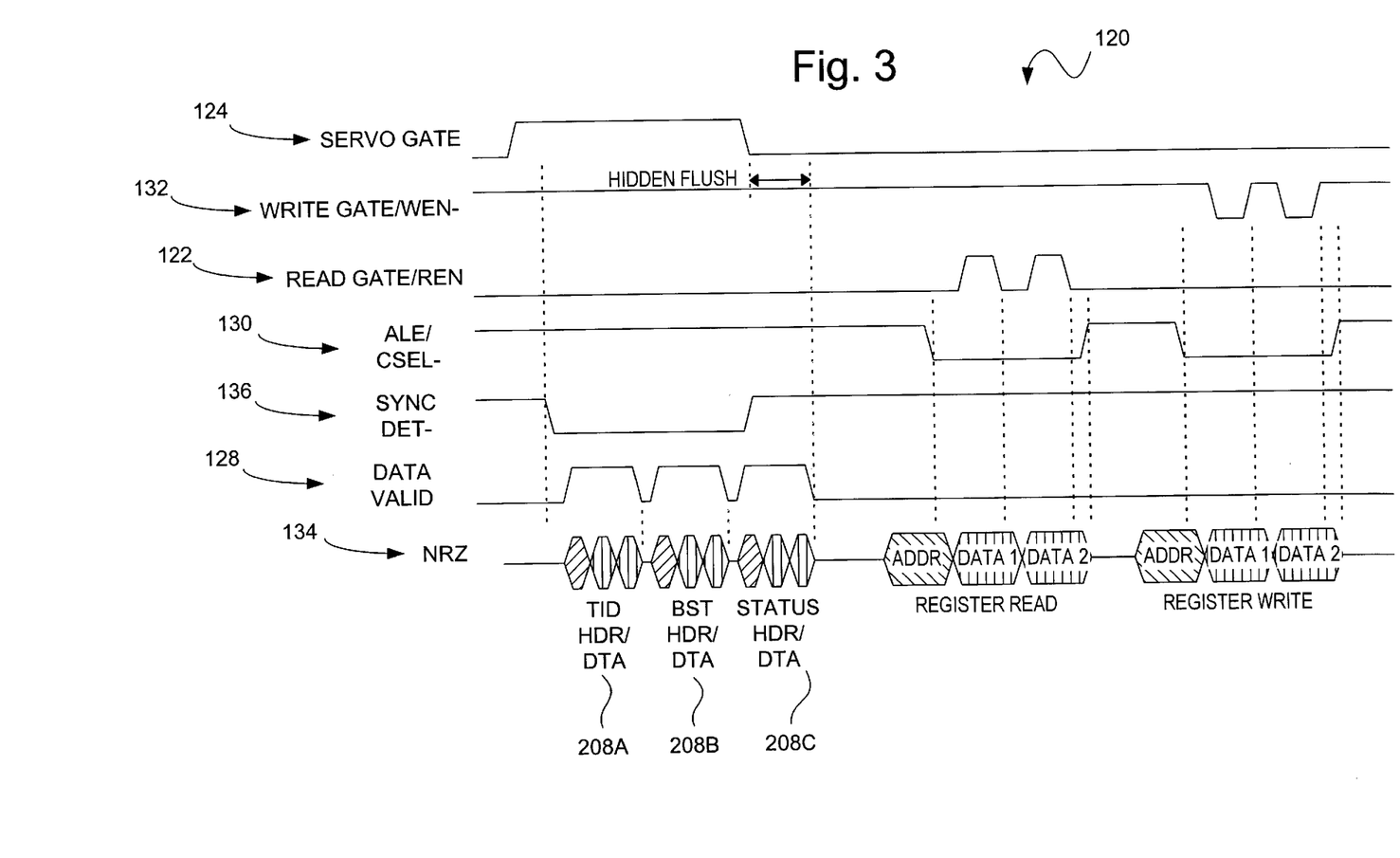
FIG. 3 depicts a timing diagram illustrating a transfer of register data on the unified bus of FIG. 1.

With reference to FIG. 3, a series of time-aligned graphic rows are presented illustrating alternately a read operation to read data from registers in channel circuit 50, and a write operation to write data in such registers. From FIG. 1, disk controller circuit 150 provides storage 154 for a register data image which is loaded and read by a microprocessor 160. This configuration reduces pin count and gate count requirements in channel circuit 50 by eliminating an additional interface to microprocessor 160 and using disk controller 150 and unified bus 120 to accommodate register read/write operations in channel circuit 50.

Disk controller circuit 150 is commanded to perform a register read or write operation by microprocessor 160. To do so, it must ensure that unified bus 120 is free of traffic, including pending read data from channel circuit 50. If DATA VALID signal 128 is not asserted and it is not time to read servo data, then transmission of register data may be accomplished. In FIG. 3, a series of servo packets 208A–C are transmitted on unified bus 120, then there is an interval during which unified bus 120 is free of traffic. Microprocessor 160 directs disk controller circuit 150 to read register data from register stack 64 in channel circuit 50. Disk controller circuit 150 transmits a register address onto the NRZ DATA BUS 134 and asserts ALE/CSEL- 130 to configure the channel circuit 50 into register mode and capture (latch) the register address. When ALE/CSEL- 130 is asserted, WRITE GATE-/WEN- 132 functions as a write enable (WEN-) for defining register write operations and READ GATE/REN 122 functions as a register read enable (REN) for register read operations as shown in FIG. 3. Next, disk controller 150 asserts REN 122 to read data from the register whose address has been latched and channel circuit 50 places data (e.g. DATA1) on NRZ DATA BUS 134. In the example shown in FIG. 3, disk controller asserts REN a second time while ALE/CSEL is asserted. This second assertion of REN 122 causes channel circuit 50 to automatically increment the latched register address and read data from a next sequential register (DATA2). The register read operation concludes with ALE/CSEL- being de-asserted.

Next, a register write operation is shown. The operation is similar to the read operation, except that WEN- 132 is asserted instead of REN 122 so that channel circuit 50 stores the register data in the address strobed on NRZ DATA BUS 134. Disk controller 150 places register data DATA1 and DATA2 on NRZ DATA BUS 134 for respective assertions of WEN- 132.

Figure 4:
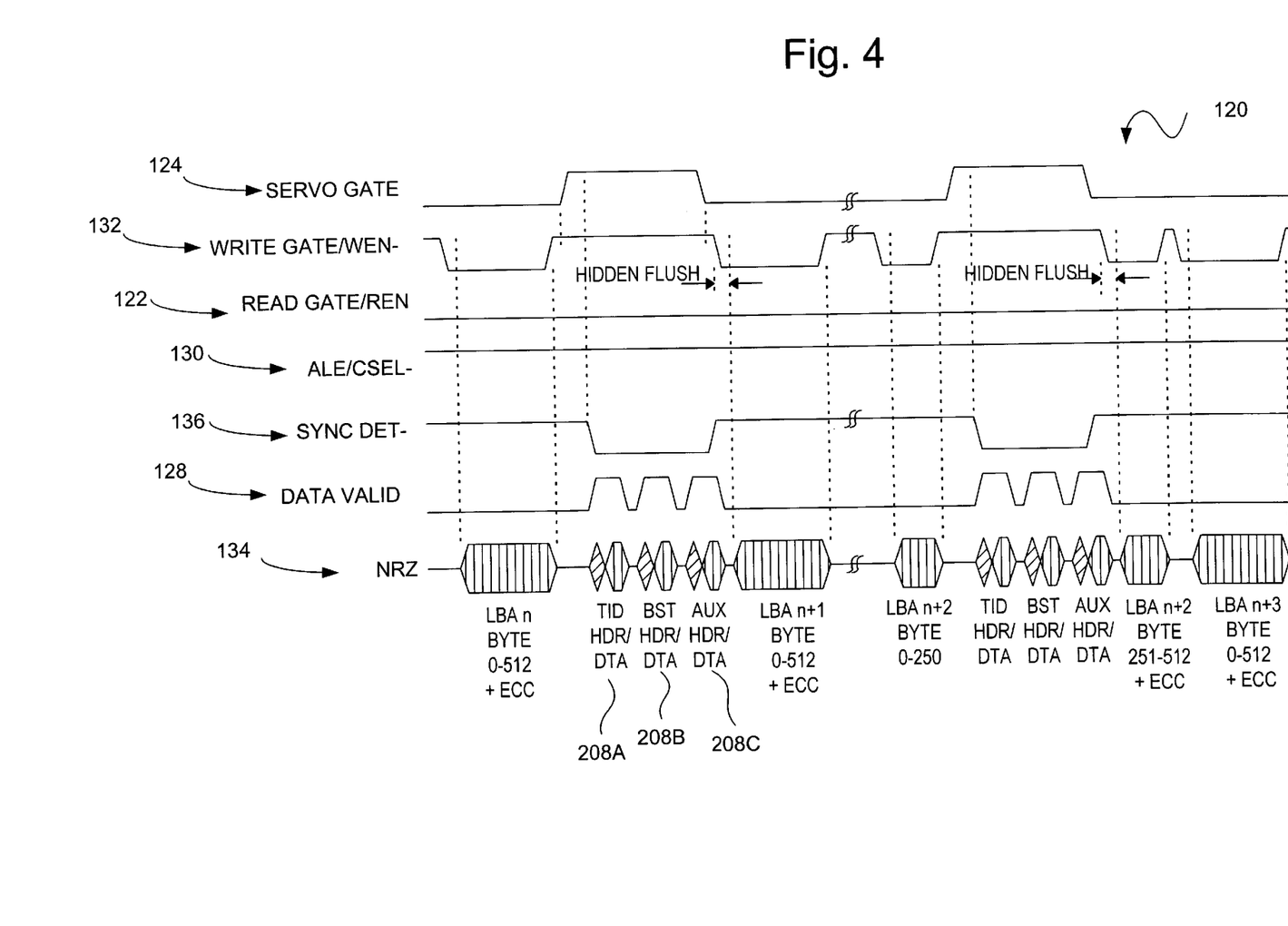
FIG. 4 depicts a timing diagram illustrating a write operation on the unified bus of FIG. 1 for writing user data to the disk of FIG. 1.

With reference to FIG. 4, a series of time-aligned graphic rows illustrating a series of user data write operations on unified bus 120 for writing user data to rotating medium 16. When it is time to write data to rotating medium 16, WRITE GATE- 132 is asserted by disk controller circuit 150. The ALE/CSEL- 130 can not be asserted during write operations. Channel circuit 50 will activate WRITE GATE 132 to the preamplifier, driving head 26 to begin writing a preamble. Disk controller 150 then transmits the data bytes and ECC bytes comprising a user data sector LBA n. The data is then written. The chart of FIG. 4 illustrates writing four user data sectors LBA n, LBA n+1, LBA n+2 and LBA n+3. LBA n and LBA n+1 are written as full data sectors with a servo wedge in between them. LBA n+2 is written as a split data sector and LBA n+3 is written as a full data sector. At the end of a sector or a split of a sector, the controller deasserts WRITE GATE 132 after the last user data has been transferred.

Figure 5A:
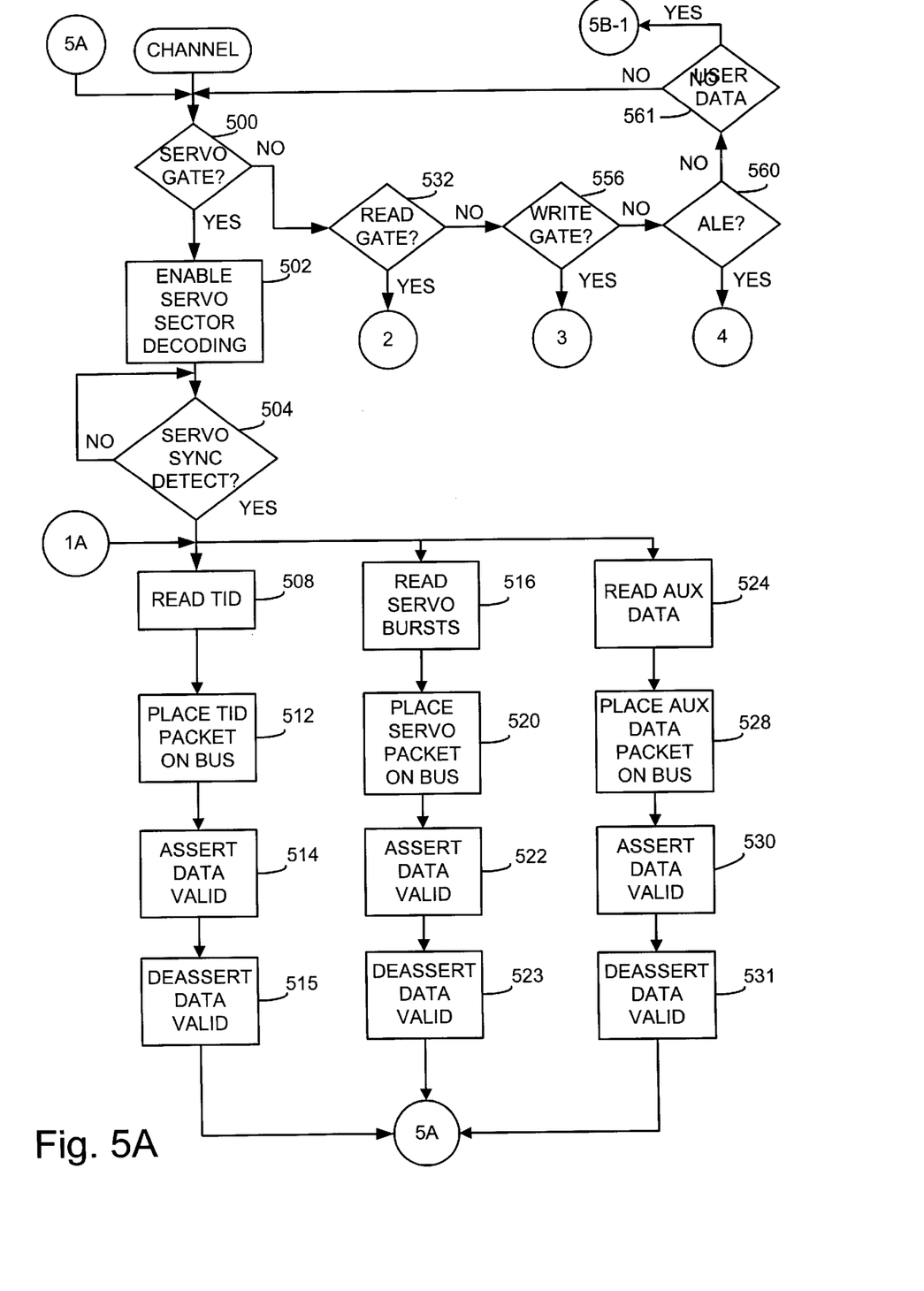
FIGS. 5A–5D depict flowcharts illustrating operations of the channel circuit of the FIG. 1.

With reference to FIG. 5A, a flowchart illustrating channel circuit 50 operations is shown. Symbolically, channel circuit 50 loops through tests 500, 532, 556, 560, for an assertion of SERVO GATE, READ GATE, WRITE GATE, or ALE from disk controller circuit 150. If none of the aforementioned timing function signals is asserted, channel circuit 50 tests at step 561 for a continuation of an interrupted transmission of user data. If so, operations proceed at connector 5B-1 in FIG. 5B. Starting with step 500, if SERVO GATE is asserted, then channel circuit 50 is enabled for servo sector demodulating, step 502. Next, channel circuit 50 detects a servo sync signal from rotating medium 16, step 504 and proceeds to assert SYNC DET- (not shown). From this point, a sequence of packets representing servo sector components are transmitted such as described in FIGS. 2, 3, or 4 above. The sequence of transmission depends on specific implementation, therefore a next step would be either reading track ID step 508, reading servo bursts step 516 or reading auxiliary data step 524. For each servo sector component, a packet is placed on unified bus 120 as in step 512, 520 or 528, DATA VALID 128 is asserted at step 514, 522, or 530, and de-asserted after an appropriate interval at step 515, 523, or 531.

Figure 5B:
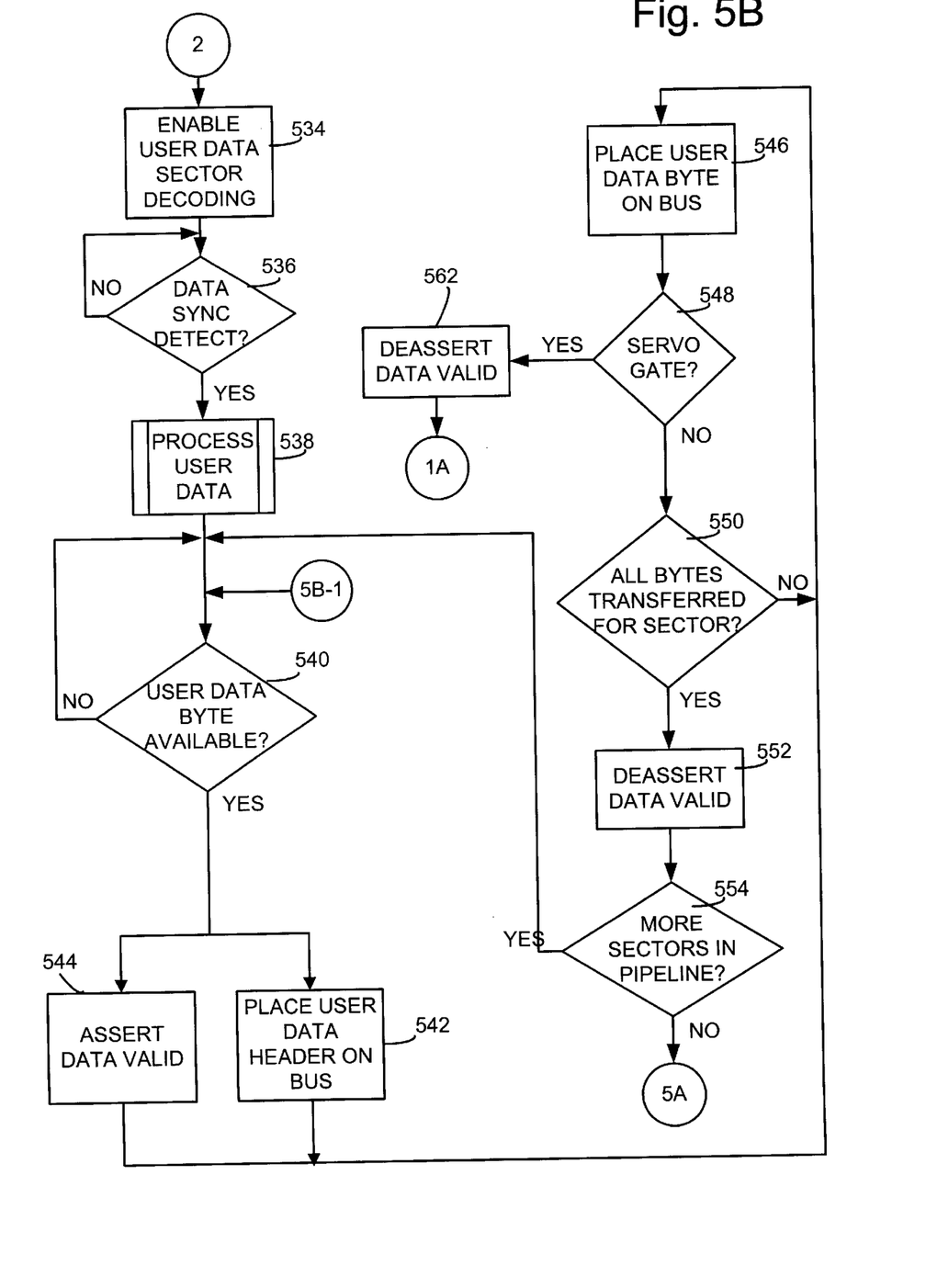

If READ GATE 122 is asserted by disk controller circuit 150, step 532, then processing moves to connector 2 at step 534 in FIG. 5B. In step 534, channel circuit 50 is enabled for reading and demodulating user data sectors. Initially, channel circuit 50 detects a data sync signal from rotating media 16, at step 536.

Next, data detection circuit 54 begins to process the user data bytes which are received from rotating medium 16, thus causing a T2 latency delay for the demodulating process, in step 538. Channel circuit 50 then checks for a user data byte available from demodulating circuit 54 at step 540, indicating the start of demodulated data. If so, the channel circuit 50 places a user data header on the bus at step 542 and asserts the DATA VALID 128, step 544. Next, the user data byte is placed on the unified bus 120, step 546. While transmitting the data bytes on the unified bus 120, the channel circuit 50 checks to see if the SERVO GATE 124 has been asserted by the disk controller circuit 150, step 548.

If disk controller circuit 150 has asserted SERVO GATE 124, meaning that it is time for a servo wedge to pass under transducer head 26 on rotating medium 16, then channel circuit 50 terminates transmission at step 562 and deasserts data valid. Although not shown in the flow chart of FIG. 5B, channel circuit 50 may preferably continue to transmit user data bytes for some period of time after SERVO GATE 124 is asserted in a "hidden flush" operation as there is a window of time until the servo sync mark is detected to continue such transmission.

If SERVO GATE 124 is not asserted in step 548, then a check is made to see if all bytes are transferred for the current data sector or data sector segment, step 550. If not, the loop continues at step 546. Otherwise, channel circuit 50 deasserts DATA VALID 128, step 552. If more data sectors are being processed, step 554, then processing moves back to step 540 to await the start of a next user data segment.

Figure 5C:
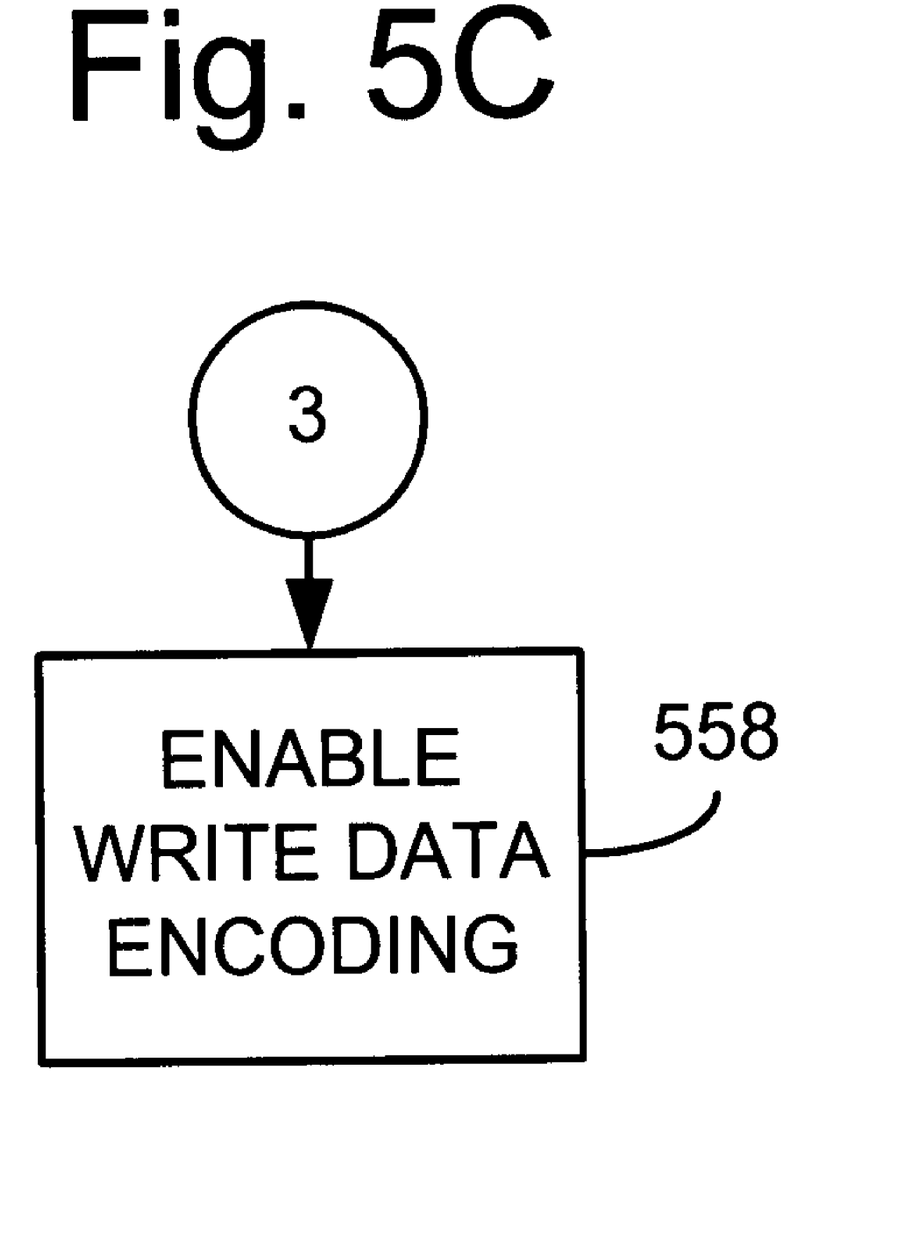

With reference back to FIG. 5A, if WRITE GATE 132 is asserted by disk controller 150, step 556 then processing moves to step 558 in FIG. 5C. In step 558, channel circuit 50 is then enabled for write data encoding and receives write data as shown in FIG. 4.

Figure 5D:
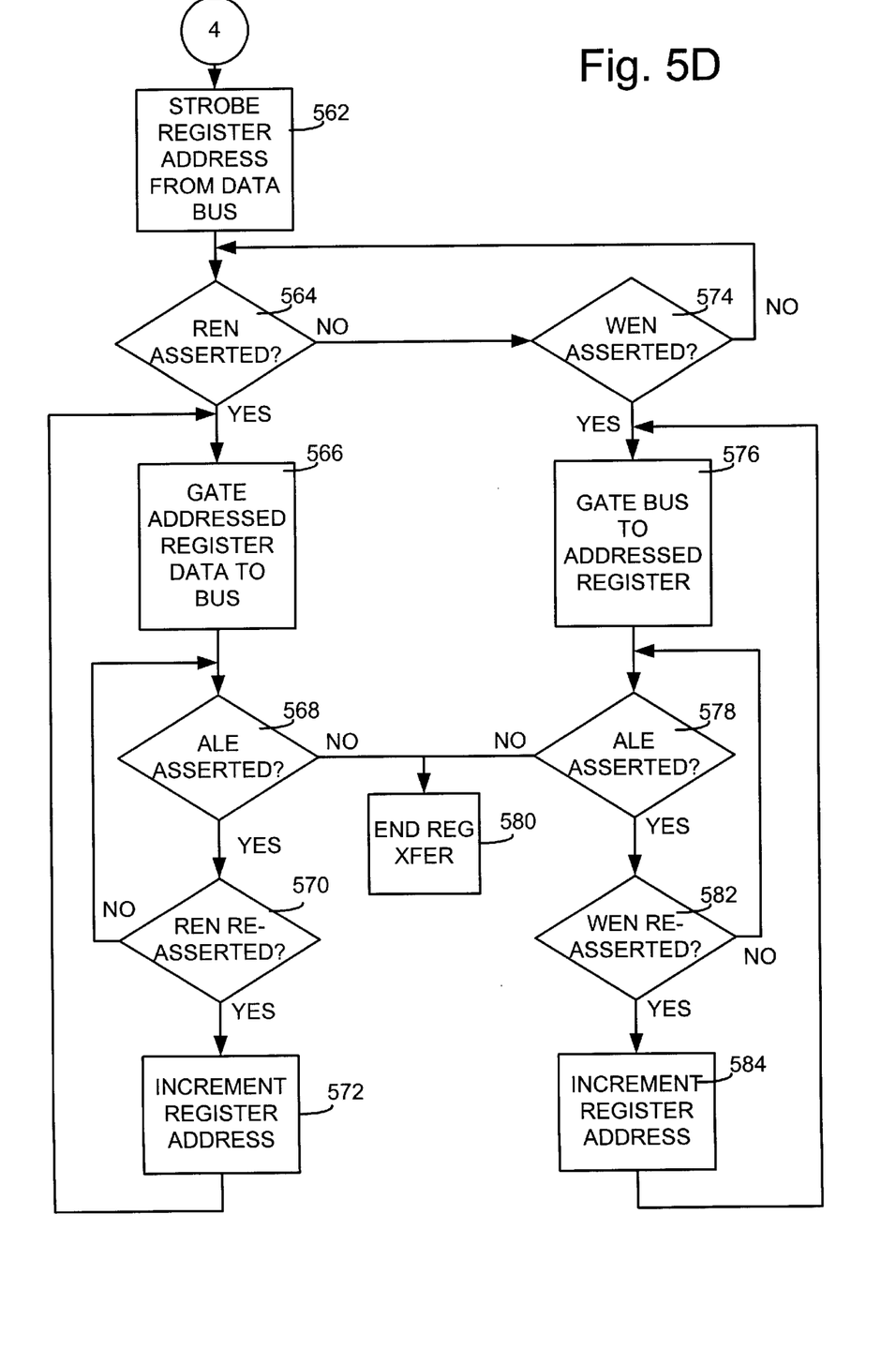

Returning to FIG. 5A, if ALE/CSEL- 130 is asserted by disk controller circuit 150, step 560, then processing moves to step 562 in FIG. 5D. Channel circuit 50 then latches the register address from the bus, step 562. The channel circuit 50 checks to see if REN 132 is asserted, step 564. If REN 564 is asserted, then channel circuit 50 gates the addressed register data to unified bus 120, step 566. Channel circuit 50 then checks to see if ALE/CSEL- 130 is still asserted, step 568. If ALE/CSEL- 130 is still asserted, then channel circuit 50 checks to see if REN 122 has been reasserted, step 570. If REN 122 has been reasserted, then channel circuit 50 increments the register address, step 572. Processing moves back to step 566.

If WEN- 132 is asserted, step 574, then channel circuit 50 gates data from unified bus 120 to the addressed register, step 576. Channel circuit 50 then checks to see if ALE/CSEL- 130 is still asserted, step 578. If not, then transfer of the register data is ended, step 580. Otherwise, channel circuit 50 checks to see if WEN- 132 is reasserted, step 582. If WEN- 132 is reasserted, the register address is incremented, step 584, and processing moves back to step 576.

Figure 6A:
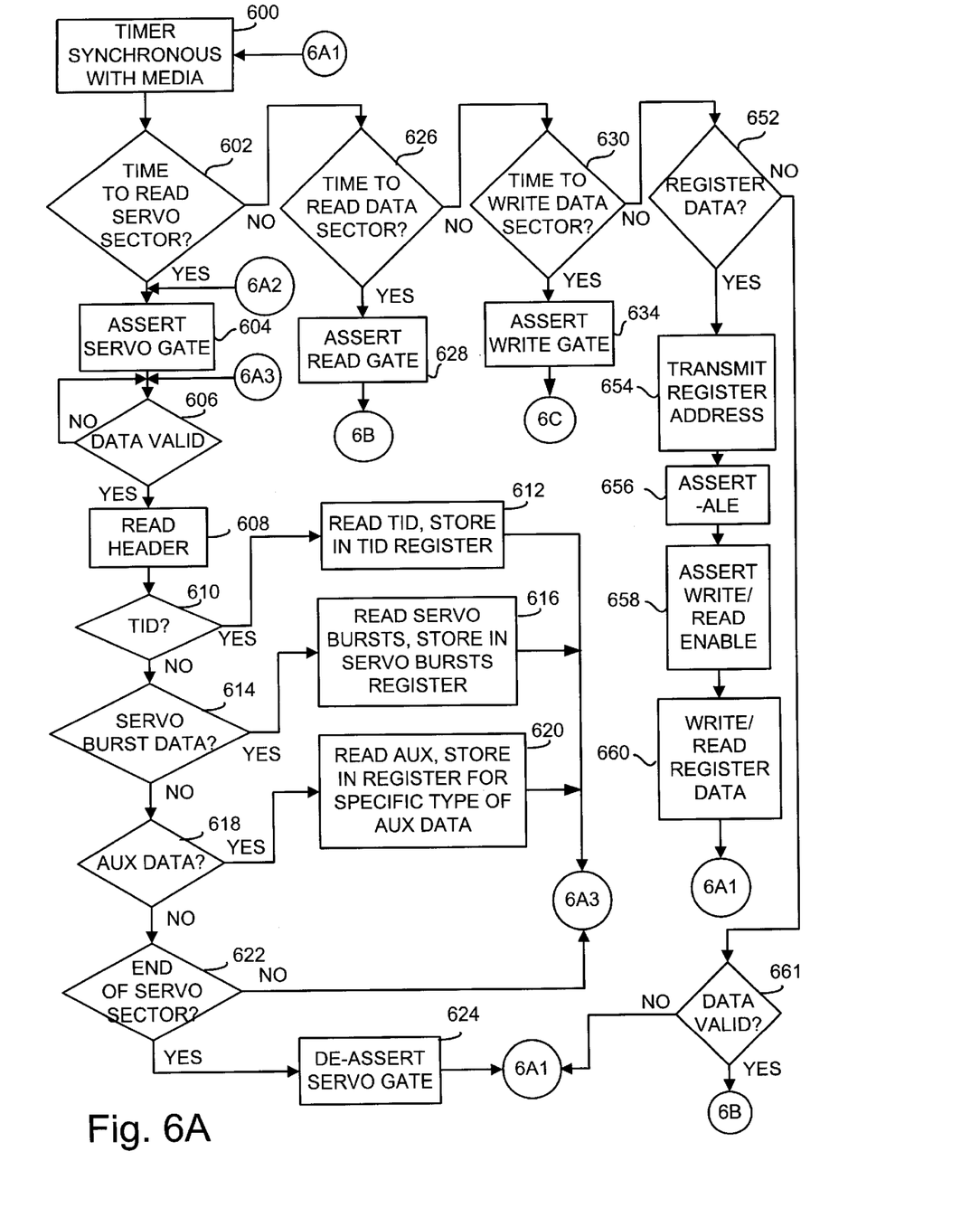

With reference to FIG. 6A, a flowchart illustrating disk controller circuit 150 operation is shown. At step 600, a timer which is synchronous with rotating disk 16 is employed to define time intervals for reading or writing data on rotating disk 16. At step 602, if it is time for channel circuit 50 to receive a servo sector 108 from rotating disk 16, disk controller circuit 150 asserts SERVO GATE 124, step 604. Although not shown in FIG. 6A, disk controller circuit 150 then waits for SYNC DET- 136 to be asserted by channel circuit 50 before proceeding. If SYNC DET- 136 is not asserted, the disk drive will revert to various error recovery procedures which are well known in the art. Thereafter when DATA VALID 128 is asserted at step 606, disk controller circuit 150 reads the header byte, step 608, which identifies the type of servo data being received from channel circuit 50. If the header indicates that a TIM packet is being transmitted from channel circuit 50, step 610, then the TID packet is read from unified bus 120 and stored in a TID register, step 612. Processing then loops back to connector 6A3 at step 608.

If the header indicates that a servo burst packet is being received, step 614, then disk controller circuit 150 reads the servo burst packet and stores it in a servo burst register step 616. Processing then loops back to step 608 via connector 6A3.

If the header indicates that auxiliary servo data is being transmitted, step 618, then disk controller circuit 150 reads the auxiliary servo data and stores it in a register for the specific type of auxiliary servo data that is being received, step 620. Processing then loops back to step 606.

If servo sector 108 is completed, step 622, then disk controller circuit 150 de-asserts SERVO GATE 124, step 624. Although the examples illustrated herein show the servo wedge components 208A, 208B and 208C being transmitted as separate packets, in an alternate embodiment the components can be transmitted in a single packet with or without intervening headers. In these or other embodiments, the servo wedge components can be transmitted in a different order than that shown.

If it is time for channel circuit 50 to read a data sector, step 626, then disk controller 150 asserts READ GATE 122, step 628, to enable channel circuit 50 to receive a data sector as explained with respect to FIGS. 5A–5B above.

If it is time to write a user data sector to rotating disk 16, step 630, WRITE GATE signal 132 is asserted at step 632. Processing then moves to step 634 in FIG. 6C. In step 634, disk controller circuit 150 delays placing data on unified bus 120 while channel circuit 50 is writing a preamble segment on the media. During this preamble period, data from a previous operation may be placed on unified bus 120 by channel circuit 50 to perform another type of "bidden flush" where data transfer on the unified bus overlaps the writing of the data sector preamble. Otherwise, at the appropriate time, disk controller circuit 150 places a data sync byte code on unified bus 120 to instruct channel 50 to write a data sync mark on disk 16. If the data is for the beginning of a split data sector—i.e. less than a complete data sector—step 636, then disk controller circuit 150 transmits the first part of the data sector on unified bus 120, step 638. WRITE GATE 132 is then deasserted, step 640. If the data to be written is the second part of a split data sector, step 642, then disk controller circuit 150 transmits the second part of the data sector on unified bus 120, step 644. Otherwise, disk controller circuit 150 transmits the entire data sector on unified bus 120, step 646. Disk controller circuit 150 then deasserts WRITE GATE 132 step 648, and processing returns to step 600 in FIG. 6A.

If disk controller circuit 150 requires transmission of register data on unified bus 120, step 652, disk controller 150 transmits the register address, step 654. Disk controller circuit 150 asserts ALE/CSEL- 130, step 656. Depending on whether register data is to be read from a channel circuit 50 register stack 64, or transmitted from the image of register data 154 in disk controller circuit 150 to register stack 64, disk controller circuit 150 asserts either REN 122 or WEN-132, step 658. Disk controller circuit 150 then reads or writes register data from or to unified bus 120, step 660 as explained with respect to FIG. 3 above.

Figure 6B:
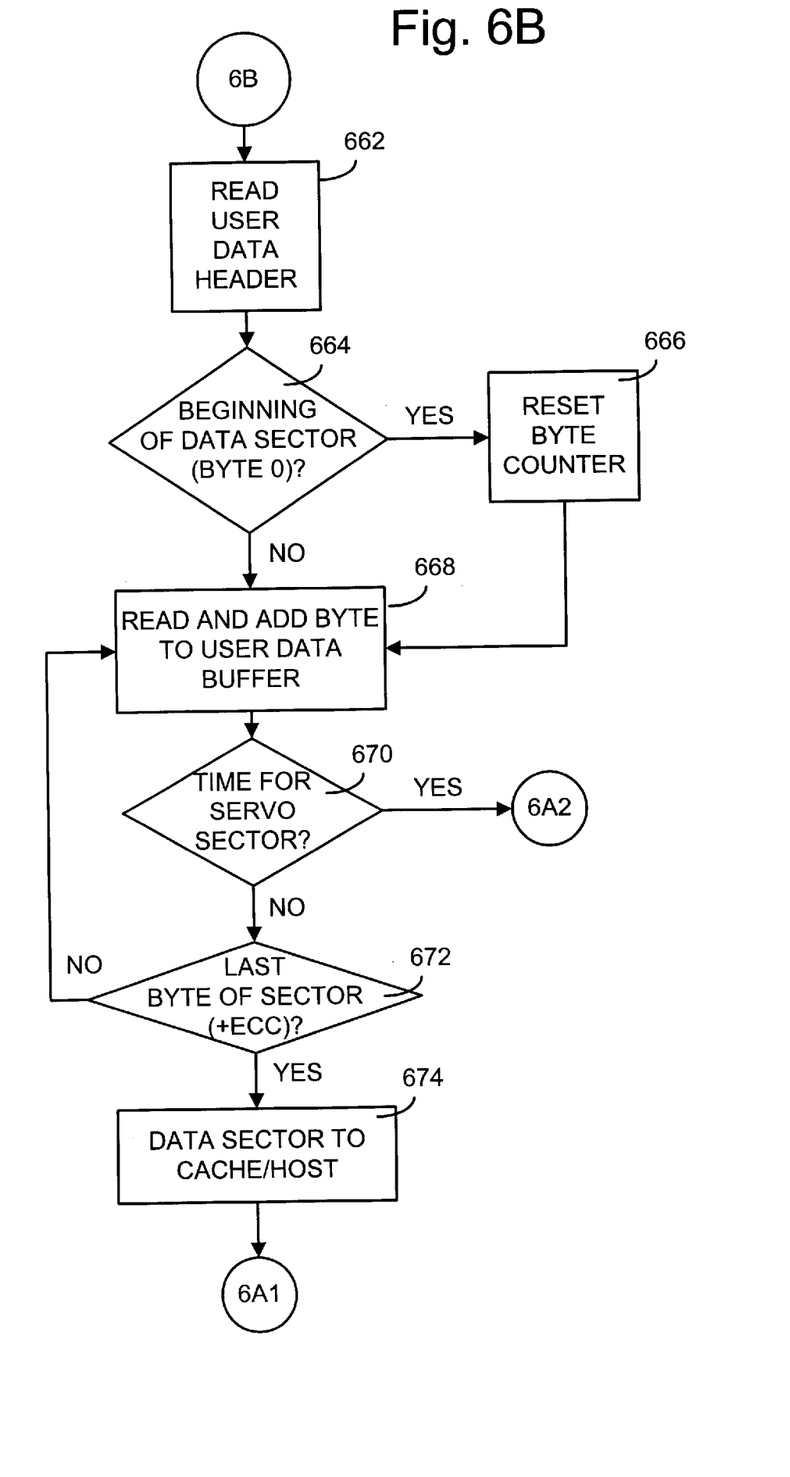
Figure 6C:
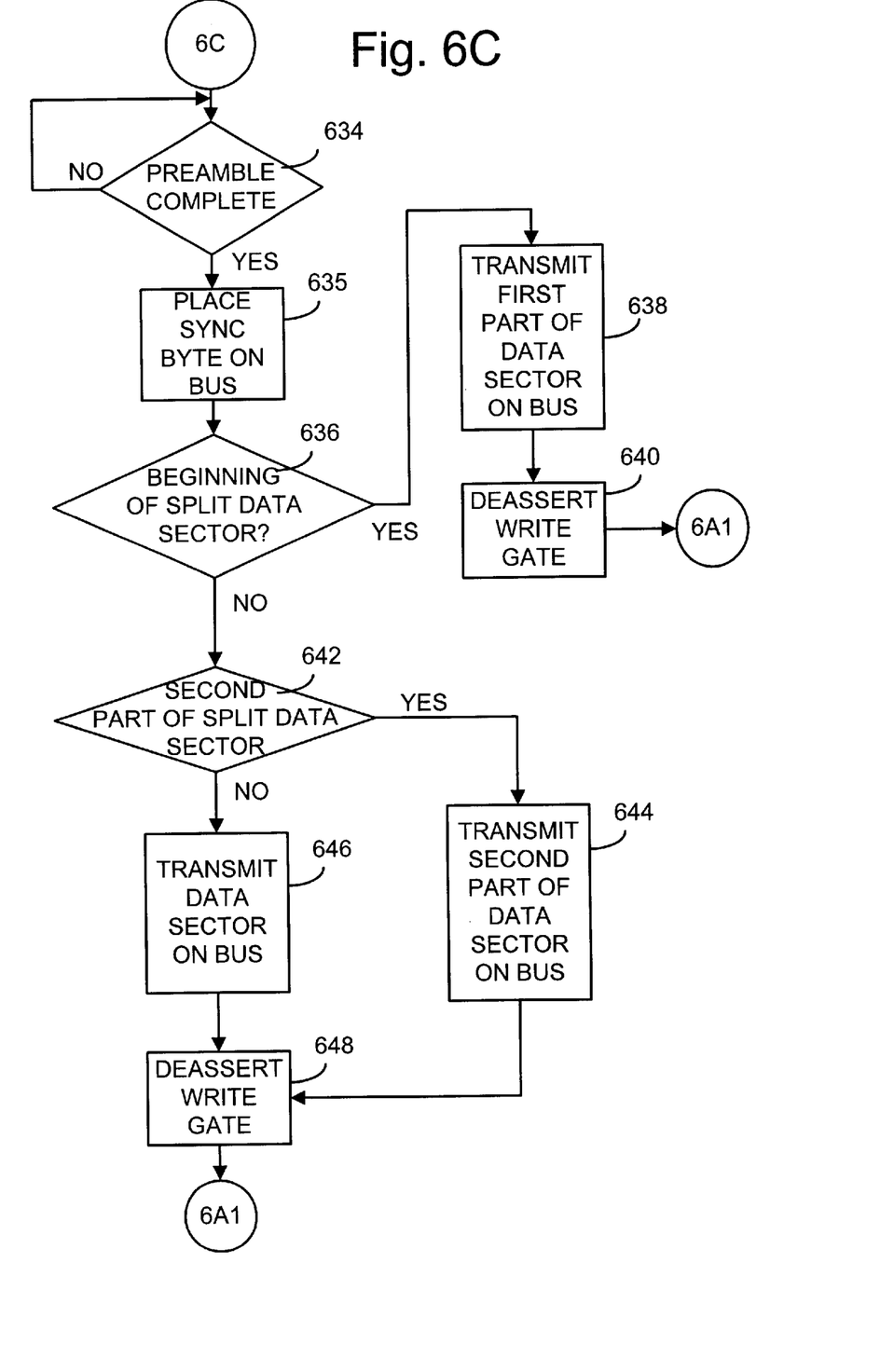

If channel circuit 50 asserts DATA VALID 128 at step 661, processing moves to step 662 in FIG. 6B. In step 662, disk controller circuit 150 reads the user data header byte from NRZ DATA BUS 134 of unified bus 120. Disk controller circuit 150 determines if the data packet is the beginning of a demodulated data sector, step 664. If the data packet does represent the first part of a data sector, disk controller circuit 150 resets a byte counter to 0, step 666. Disk controller circuit 150 then adds the byte to a user data buffer, step 668. Disk controller circuit 150 checks the timer to determine if it is time for a servo sector to be processed, step 670. If so, then processing moves to step 604 in FIG. 6A Otherwise, if the last data byte, plus error correction codes, has not been received, step 672, then processing moves back to step 668. If the last data byte plus error correction codes have been received, then the data sector received is released to the host, step 674.

We claim:

1. A disk drive comprising:
   a disk comprising a track having a data sector and a servo sector;
   a channel circuit;
   a disk controller circuit;
   a unified bus connected between the channel circuit and the disk controller circuit and having a data-carrying medium;
   the channel circuit comprising:
   a channel register for storing register data;
   means for receiving and demodulating a first series of signals representing data stored in the servo sector to create a first demodulated series of signals;
   means for receiving and demodulating a second series of signals representing data stored in at least a portion of the data sector to create a second demodulated series of signals;
   a channel output stream engine coupled to the unified bus for transmitting and receiving the register data and for transmitting the first and second demodulated series of signals on the data-carrying medium;
   wherein during a first interval the data-carrying medium reflects the register data, during a second interval the data-carrying medium reflects the first demodulated series of signals, and during a third interval the data-carrying medium reflects the second demodulated series of signals.

2. The disk drive of claim 1, wherein the disk controller circuit includes means for timing the receiving of the first and second series of signals.

3. The disk drive of claim 2, wherein the unified bus includes a read gate signal.

4. The disk drive of claim 3, wherein the disk controller circuit asserts the read gate signal when it is time for the channel circuit to receive the second series of signals.

5. The disk drive of claim 2, wherein the unified bus further comprises a servo gate signal.

6. The disk drive of claim 5, wherein the disk controller circuit asserts the servo gate signal when it is time for the channel circuit to receive the first series of signals.

7. The disk drive of claim 1 wherein the second series of signals are demodulated and transmitted with longer latency than the first series of signals.

8. The disk drive of claim 1, wherein the unified bus further comprises a data valid signal.

9. The disk drive of claim 8, wherein the channel circuit asserts the data valid signal for transmitting each of the first and second demodulated series of signals.

10. The disk drive of claim 9, wherein the first demodulated series of signals is transmitted in a plurality of servo data packets, wherein each servo data packet includes an identification header.

11. The disk drive of claim 10, wherein the channel circuit asserts the data valid signal at the beginning of transmitting each servo data packet and de-asserts the data valid signal at the end of transmitting each servo data packet during the second interval.

12. The disk drive of claim 1, further comprising a microprocessor and a microprocessor bus connecting the microprocessor to the disk controller circuit, wherein the microprocessor transmits control commands to the disk controller circuit.

13. The disk drive of claim 12, wherein the disk controller circuit further comprises a register data image for storing the register data.

14. The disk drive of claim 13, wherein the microprocessor transmits control commands to the disk controller circuit to enable the disk controller circuit to transmit the register data on the unified bus during the first interval.

15. The disk drive of claim 14, wherein the disk-controller bus further comprises an address latch enable chip select signal (ALE/CSEL).

16. The disk drive of claim 15, wherein the disk controller circuit is further for asserting the ALE/CSEL at the beginning of the first interval and for de-asserting the ALE/CSEL at the end of the first interval.

17. The disk drive of claim 1, wherein the unified bus further comprises a write gate signal.

18. The disk drive of claim 17, wherein the disk controller circuit asserts the write gate signal during a fourth interval wherein a third series of signals comprising write data are transmitted from the disk controller circuit to the channel circuit during the fourth interval.

19. The disk drive of claim 1, wherein the channel circuit transmits a data header signal for identifying the second series of signals before transmitting the second series of signals.

20. The disk drive of claim 1 wherein the data-carrying medium is a serial bus.

21. The disk drive of claim 1 wherein the data-carrying medium is a parallel bus.

* * * * *